US010466722B2

United States Patent
Mortensen et al.

(10) Patent No.: US 10,466,722 B2
(45) Date of Patent: Nov. 5, 2019

(54) PROCESS AND SAFETY CONTROL SYSTEMS FOR A HYDROGEN REFUELING STATION

(71) Applicant: Nel Hydrogen A/S, Herning (DK)

(72) Inventors: Henrik Hilleke Mortensen, Haderup (DK); Claus Due Sinding, Herning (DK); Jesper Nissen Boisen, Herning (DK)

(73) Assignee: Nel Hydrogen A/S, Herning (DK)

( * ) Notice: Subject to any disclaimer, the term of this patent is extended or adjusted under 35 U.S.C. 154(b) by 92 days.

(21) Appl. No.: 15/443,947

(22) Filed: Feb. 27, 2017

(65) Prior Publication Data

US 2017/0248975 A1 Aug. 31, 2017

(30) Foreign Application Priority Data

Feb. 26, 2016 (DK) .................................. 2016 70112
Mar. 2, 2016 (DK) .................................. 2016 70123

(51) Int. Cl.
*G05D 7/06* (2006.01)
*F17C 7/00* (2006.01)
(Continued)

(52) U.S. Cl.
CPC ............. *G05D 7/0635* (2013.01); *F17C 5/06* (2013.01); *F17C 7/00* (2013.01); *F17C 13/025* (2013.01);
(Continued)

(58) Field of Classification Search
CPC .................. F17C 13/025; F17C 13/026; F17C 2221/012; F17C 2223/036; F17C 2250/043; F17C 2250/0439; F17C 2265/065; F17C 5/06; F17C 13/04; F17C 2227/0157; F17C 2227/0337; F17C 2250/03;
(Continued)

(56) References Cited

U.S. PATENT DOCUMENTS 5,003,813 A 4/1991 Hayes
5,029,622 A 7/1991 Mutter
(Continued)

FOREIGN PATENT DOCUMENTS

CA          2420571 A1    8/2004
CA       2006065602 A1    8/2004
(Continued)

*Primary Examiner* — Chun Cao
(74) *Attorney, Agent, or Firm* — Bodi Law LLC

(57) ABSTRACT

The invention relates to a HRS for filling a vessel of a vehicle with hydrogen, the HRS 1 comprising: a basic process control system comprising a process controller, a plurality of process measuring devices, a plurality of final process elements and a plurality of associated basic process control functions facilitating monitoring and controlling the operation of the HRS, wherein the HRS further comprises a safety instrumented system comprising a safety controller, a plurality of safety measuring devices, a plurality of final safety elements a plurality of associated safety instrumented functions, wherein at least one of the final process elements and the final safety elements facilitates tripping the operation of the HRS under the control of the associated process controller or the associated safety controller respectively.

20 Claims, 3 Drawing Sheets

Figure 1:
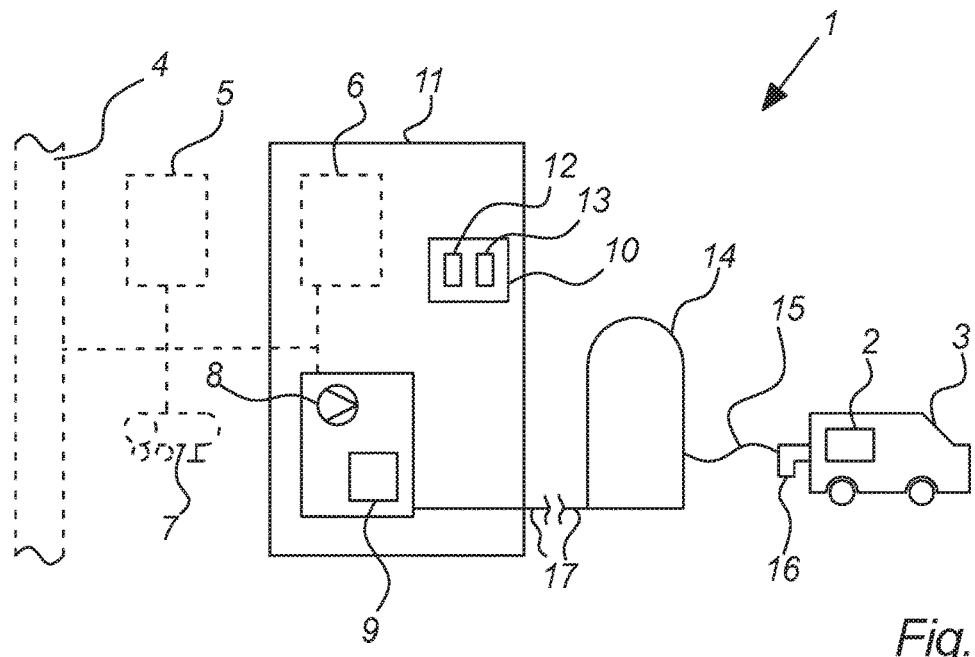

(51) Int. Cl.
*F17C 5/06* (2006.01)
*F17C 13/02* (2006.01)
*G05B 9/02* (2006.01)
*B60K 15/03* (2006.01)

(52) U.S. Cl.
CPC .............. *F17C 13/026* (2013.01); *G05B 9/02* (2013.01); *B60K 2015/03315* (2013.01); *F17C 2221/012* (2013.01); *F17C 2223/036* (2013.01); *F17C 2227/0157* (2013.01); *F17C 2227/0337* (2013.01); *F17C 2250/032* (2013.01); *F17C 2250/043* (2013.01); *F17C 2250/0439* (2013.01); *F17C 2250/0443* (2013.01); *F17C 2250/0478* (2013.01); *F17C 2250/0626* (2013.01); *F17C 2250/0631* (2013.01); *F17C 2250/0636* (2013.01); *F17C 2250/0694* (2013.01); *F17C 2260/02* (2013.01); *F17C 2260/042* (2013.01); *F17C 2265/061* (2013.01); *F17C 2265/065* (2013.01); *F17C 2270/0139* (2013.01); *F17C 2270/0168* (2013.01); *Y02E 60/321* (2013.01)

(58) Field of Classification Search
CPC ........ F17C 2250/032; F17C 2250/0443; F17C 2250/0478; F17C 2250/0626; F17C 2250/0631; F17C 7/00; G05D 16/2046; G05D 16/206; G05D 7/0635; G05B 9/02
USPC .................................. 700/282, 283; 141/96
See application file for complete search history.

(56) References Cited

U.S. PATENT DOCUMENTS

| | | | |
|---|---|---|---|
| 5,091,716 A | 2/1992 | Nelson et al. | |
| 6,755,225 B1* | 6/2004 | Niedwiecki | B60P 3/14 |
| | | | 141/18 |
| 7,868,775 B2* | 1/2011 | Sirosh | F17C 11/005 |
| | | | 340/612 |
| 9,347,614 B2* | 5/2016 | Mathison | F17C 5/06 |
| 2004/0163731 A1* | 8/2004 | Eichelberger | B60S 5/02 |
| | | | 141/284 |
| 2005/0000802 A1 | 1/2005 | Hobbs | |
| 2006/0118175 A1 | 6/2006 | Mathison et al. | |
| 2009/0072986 A1 | 3/2009 | Bussert et al. | |
| 2012/0111447 A1 | 5/2012 | Mori et al. | |
| 2012/0227864 A1 | 9/2012 | Mori | |
| 2013/0014855 A1 | 1/2013 | Yahashi et al. | |
| 2013/0092243 A1 | 4/2013 | Mohammed et al. | |
| 2013/0139897 A1 | 6/2013 | Kim et al. | |
| 2014/0076033 A1 | 3/2014 | Simmons | |
| 2015/0153005 A1 | 6/2015 | Takano et al. | |
| 2015/0308621 A1* | 10/2015 | Mathison | F17C 5/007 |
| | | | 141/4 |

FOREIGN PATENT DOCUMENTS

| | | |
|---|---|---|
| CN | 203273284 U | 11/2013 |
| CN | 204925741 U | 12/2015 |
| DE | 102013200330 A1 | 7/2014 |
| EP | 2 175 187 A2 | 8/2009 |
| JP | 1987-203202 | 9/1987 |
| JP | 1996068497 | 10/1997 |
| JP | 1998169896 | 4/1999 |
| JP | 2005265067 | 3/2004 |
| JP | 2006-214512 | 8/2006 |
| JP | 2007239956 | 9/2007 |
| JP | 2008019996 | 1/2008 |
| WO | 2006065602 A2 | 6/2006 |
| WO | 2011012939 A1 | 2/2011 |
| WO | 2011049466 A1 | 4/2011 |

* cited by examiner

PROCESS AND SAFETY CONTROL SYSTEMS FOR A HYDROGEN REFUELING STATION

CROSS REFERENCES TO RELATED APPLICATIONS

This application claims the benefit of Danish patent application No. PA 2016 70112 filed on Feb. 26, 2016, and Danish patent application No. PA 2016 70123 filed on 2 Mar. 2016, both incorporated herein by reference.

FIELD OF THE INVENTION

The present invention relates to a control system for a hydrogen refuelling station, and a method for controlling the hydrogen refuelling station with such control system

BACKGROUND OF THE INVENTION

As the number of Hydrogen Refuelling Stations (HRS) are beginning to increase focus from HRS manufactures are on cutting prices of the individual HRS without compromising its safety.

A control system for a HRS is disclosed in WO2006065602. The architecture of this control system depends on a control manager and plurality of subsystem managers. The master control manager manages the control of a purifying hydrogen generator through a plurality of dedicated subsystem managers. Accordingly the subsystems controlling the fuel, water, air, etc. are controlled in a decentral manner by the subsystem controllers which are communicative attached to the master control manager.

Prior art document WO2006065602 is an example of the safety consideration made in relation to control of HRS. However, these considerations are made on a system level and therefore does not solve a range of problems such as implementation, faults occurring at system levels, control strategies in faulty situation and the like.

SUMMARY

It is an object of the present invention to overcome these problems. Therefore the present invention relates to a HRS for filling a vessel of a vehicle with hydrogen, the HRS comprising: a hydrogen supply, a hydrogen outlet connectable to the vessel of the vehicle, and a basic process control system comprising a process controller, a plurality of process measuring devices, a plurality of final process elements and a plurality of associated basic process control functions facilitating monitoring and controlling the operation of the HRS, characterized in that the HRS further comprises a safety instrumented system comprising a safety controller, a plurality of safety measuring devices, a plurality of final safety elements a plurality of associated safety instrumented functions, wherein at least one of the final process elements and the final safety elements facilitates tripping the operation of the HRS under the control of the associated process controller or the associated safety controller respectively.

It is preferred that the tripping of the operation of the HRS is performed by the execution of process control functions by the process controller and if for some reasons this is not happening it is advantageous that the operation of the HRS is tripped by execution of the safety instrumented functions by the safety controller.

The basic process control functions and the safety instrumented functions are preferably program code executed by microprocessors of the safety controller and the process control functions are preferably program code executed by the process controller.

Tripping operation of the HRS results preferably in an immediate stop of the operation of the HRS e.g. a refueling process is terminated immediately, stopping the cooling system, compressor, etc. in case of a hazard situation has been detected. A hazard situation may e.g. be to high pressure or temperature, to low pressure or temperature, leakage, fire, etc.

A final element capable of stopping the operation of a HRS is preferably a valve stopping flow of hydrogen in the hydrogen flow path to the nozzle or facilitating venting hydrogen via a chimney. A final element is defined by reacting on control signals examples of result of control of final elements could be stopping hydrogen flow, guiding hydrogen safe out of the chimney, tripping compressor, etc.

According to an embodiment of the invention, the number of basic process control functions are higher than the number of safety instrumented functions. It is preferred that only the basic process control functions which are safety related i.e. which can lead to a hazard situation is monitored by the safety instrumented system. Hence there is no need of the same amount of safety instrumented functions as for basic process control functions.

According to an embodiment of the invention, the safety instrumented functions provides input to the basic process control functions.

According to an embodiment of the invention, the input is used to change mode of operation of the HRS, preferably to stop operation of the HRS. This is advantageous in situations where the safety instrumented function has (safety) evaluated its input and the result hereof indicates that a hazard situation is occurring or is likely to occur. Hence the safety instrumented function may then either ask the process controller to stop the operation of the HRS and or/initiate stop of operation of the HRS by its final safety elements.

Stop or change of mode of operation is preferably done as fast as possible to prevent the hazard situation escalate.

According to an embodiment of the invention, the safety controller and the process controller comprises independent microprocessors. Advantageous in that then the controllers are completely independent.

According to an embodiment of the invention, the temperature of the hydrogen when filling the vessel of the vehicle is below minus 20° C., preferably below 30° C., most preferably between minus 33° C. and minus 40° C.

According to an embodiment of the invention, the pressure of the hydrogen at the end of a refueling of the vessel of the vehicle is equal to or above 500 bar, preferably equal to or above 750 bar, most preferably equal to or below 875 bar. Start pressure of a refueling is preferably between 1 and 700 bar depending on the pressure in the vessel when connecting to the HRS dispenser module. Preferably the pressure at the end of the refueling should be limited to a pressure at which the HRS components including hose and nozzle connecting HRS dispenser to vehicle. To refuel as much hydrogen to the vehicle vessel as allowed the end pressure is preferably between 800 and 875 bars.

According to an embodiment of the invention, wherein the HRS facilitates filling a vessel of a vehicle with hydrogen, the HRS comprising: a hydrogen supply, a hydrogen outlet connectable to the vessel of the vehicle, and a process controller configured for monitoring and controlling the operation of the HRS, wherein a value of a first parameter is measured by a process measuring device and used as input to the process controller for controlling the HRS, wherein the control of the HRS by the process controller includes stopping the operation of the HRS based on a process evaluation of the first parameter, the HRS is characterized in that it further comprises a safety controller configured for monitoring a plurality of parameters of the HRS and for at least partly controlling the HRS, wherein the value of the first parameter is also measured by a safety measuring device and used as input to the safety controller, wherein the safety controller performs a safety evaluation of the first parameter, and wherein the control of the safety controller facilitates change from a normal mode of operation to a non-normal mode of operation of the HRS by changing state of a final safety element based on the safety evaluation of the value of the first parameter.

The HRS of the present invention is advantageous in that it reduces the risk of serious incidents at the HRS as consequence of e.g. failure in a component due or software. This is because of the superior monitoring provided by the safety controller of the control performed by the process controller and the safety controllers right to overrule the process controller to change mode of operation. Accordingly, the controlling of the HRS is performed by the process controller and only in case of a value of operation parameters is out of its limit(s) without the process controller takes action, the safety controller takes over and ensures controlling the HRS into a safe mode (tripping of the HRS). I.e. during normal operation the safety controller is only monitoring the operation of the HRS without interfering in the control hereof.

Hydrogen supply is preferably a hydrogen storage allowing flow of hydrogen to the HRS via a valve. The hydrogen storage being either part of the HRS (internal storage) or storage located external to the HRS. Alternatively the hydrogen inlet may be connected to a hydrogen supply network or the like.

Monitor may also include calculations performed in controllers of the control system in particular in the safety controller. Accordingly internal comparison, aggregation and calculation of any kind may also lead to a value of a parameter which can be used in control of the HRS by any of the process or safety controllers. In case the monitoring is merely a calculation the first and second measuring devices would often be a data processor of the controllers. Preferably the controllers referred to is the safety controller and the process controller, however if needed additional controllers may be used for different purposes in supporting the process and safety controllers in carrying out its respective functions.

The first and second measuring devices may be identical devices measuring the same parameter at substantially the same location at the HRS. Examples of measuring devices (beside the data processors mentioned above for the calculations) could be transducers for monitoring pressure, temperature, flow, time, position of a valve (e.g. opened/closed), etc.

The value of a parameter (the first, second, . . . Nth parameter) measured by the measuring devices could e.g. be "1" or "0" (e.g. valve is "on" or "off"), discrete or continuous values directly or indirectly representing flow, pressure, temperature, hydrogen density, etc.

Evaluation of the value of the parameter could be e.g. comparing the value to a threshold value which is often a minimum or maximum allowable value for the parameter. Evaluation could also be comparing two measurements of pressure located distant from each other which could indicate flow of hydrogen i.e. an indirect measurement. Evaluations made by the safety controller is sometimes referred to as safety evaluations and evaluations made by the process controller is sometimes referred to as process evaluations.

It should be mentioned that the safety controller and the process controller may receive parameters such as the above mentioned first parameter from a plurality of different process and safety measuring devices.

The safety controller and the process controller may be implemented in the same enclosure, however still the safety controller and process controller preferably are having individual microprocessors and what else is required to operate completely independent to reduce or eliminate one point of failure issues.

The control carried out by the safety controller is carried out by actuators referred to as final safety elements. The safety controller is not designed to control e.g. a refueling process but rather designed to bring the HRS from a unsafe operation mode to a safe operation mode. The control carried out by the process controller is carried out by actuators referred to as final process elements. In contrary to the safety controller the process controller facilitates complete control of the HRS. The final elements are often valves.

Preferably the safety controller is monitoring a plurality of different parameters at the same time.

Preferably the safety controller is only monitoring and changing mode of operation of the HRS. This is advantageous in that then the only one controller is controlling the HRS but two controllers are monitoring the HRS and both having the authorization to change mode of operation to obtain a safer situation. Often this would mean limiting the operation of the HRS including stopping operation of the HRS.

According to an embodiment of the invention, the first parameter measured by the process and safety measuring devices, is measured in the hydrogen flow path between the hydrogen supply and the hydrogen output and wherein the first parameter is chosen from the list comprising: pressure, flow of hydrogen, valve position, temperature and time. Preferably the parameter is measured at the dispenser or at least with the relevant measuring device closest to the vehicle i.e. hydrogen output in the form of a nozzle. The hydrogen flow path is defined by the hydrogen lines, valves and other components through which hydrogen flows when refueling a vehicle and the measurement made in the hydrogen flow is preferably mead by or at these components.

These parameters may all be referred to as the first parameter above. These parameters are measured preferably at the dispenser as closes to the hydrogen outlet as possible. These parameters are categorized as critical parameters in that these parameters may indicate dangerous situations if their values exceed their limits. Therefore it is preferred to monitored and keep these parameters within defined limits to ensure safe filling of a vessel of a vehicle. Such limits may be defined by the design parameters the design of the HRS is based on.

As mentioned above, the value of the first parameter may be determined indirectly based on other measurements. As an example could be mentioned the flow of hydrogen which may be derived from two pressure measurements and a temperature measurement if the density of the hydrogen is needed.

According to an embodiment of the invention, communication between the process controller and the safety controller is unidirectional from the safety controller to the process controller. This is advantageous in that then process controller is notified by overruling control actions carried out by the safety controller and should therefore be allowed by the process controller. Accordingly the safety controller has a higher control level than the process controller allowing the safety controller to overrule control of the process controller.

Preferably only safety status signals are communicated from the safety controller to the process controller. Safety status signals could e.g. comprise information relating to control carried out by the safety controller such as tripping the operation of the HRS, status of the safety controller, etc.

Status of the safety controller indicates the health (of the operation) of the HRS hence only two safety statuses may be needed i.e. a normal operation status and an alarm operation status.

It is further advantageous that the process controller as limited access to communicate with the safety controller in that then there is no risk of the safety controller uses input from the process controller in the safety control. In some embodiments, it is therefore not possible for the process controller to communicate with the safety controller and in other embodiments it is only possible if such communication is safe or e.g. deterministic i.e. the receiver of the communication in the safety controller is predetermined or ensuring non or controlled impact on the safety instrumented functions. Thereby is obtained two completely separate monitoring and control system for increased safety of operation of the HRS.

According to an embodiment of the invention, the safety controller communicates a stop signal to the process controller if the HRS is operated in normal operation mode at the same time as the safety evaluation of the value of the first operation parameter is determined to exceed its limits.

According to an embodiment of the invention, the process controller and the safety controller are controlling the same final elements. This is advantageous if actuators (final elements) are located and controlling e.g. hydrogen flow at locations which cannot lead to a dangerous situation if the actuator is not correctly controlled.

Further actuators may be used having two internal individual actuators which then can be controlled by the safety and process controllers.

According to an embodiment of the invention, the process and safety measuring devices, are monitoring the first parameter at substantially the location. This is advantageous in that malfunction of one transducer such as a temperature or pressure sensor does not in itself cause that this parameter is not monitored. Hence if one of the process and safety measuring devices are malfunctioning the other measures the parameter which then can be used in control of the HRS.

According to an embodiment of the invention, the first and safety measuring device, are located within the same enclosure. The process and safety measuring devices could be implemented in the same enclosure or implemented as one measuring device with two outputs. In the latter case the two outputs may comply with different safety requirements.

According to an embodiment of the invention, the safety controller is active at all times during normal operation of the HRS. This is advantageous in that then the safety level provided by the combination of the process controller and the safety controller is maintained at all times.

Normal operation should be understood as when the HRS is ready for refueling a vehicle or is refueling a vehicle. Other modes of operation could be service mode where the HRS is maintained.

According to an embodiment of the invention, the safety controller can be disabled. This is relevant in relation to servicing parts of the safety instrumented system i.e. the safety controller itself or connected measuring devices or final elements.

According to an embodiment of the invention, the safety controller is at a safety level which is equal to or higher than the safety level of the process controller.

According to an embodiment of the invention, the safety measuring devices is at a safety level which is equal to or higher than the safety level of the process measuring devices. This is advantageous in that this in theory would guarantee higher reliability of the safety controller and safety measuring devices compared to the process controller and the process measuring devices. One way of defining the safety level of components such as controllers and measuring devices are according to and complying with the requirements of the functional safety IEC61508 standard or safety integrity level (SIL rated).

According to an embodiment of the invention, the process and safety measuring, devices are of different manufacture. This is advantageous in that the risk of malfunctioning of both the first and safety measuring devices is reduced in that e.g. the same design error could then not be affecting both measuring devices. Hence a high temperature or a given amount of hours of operation would not cause both the measuring devices to fail at the same time.

According to an embodiment of the invention, the change from normal to non-normal mode of operation is facilitated by tripping the operation of the HRS by means of at least one final safety element. Tripping should be understood as stopping the normal operation of the HRS. Preferably the tripping is facilitated by changing position of a valve located downstream relative (towards) to the hydrogen storage) as close to where the error is estimated to be located. Alternative or in addition hereto valves located close to the nozzle are also closed to protect the car and user of the HRS.

As an alternative to or in addition to tripping, the safety controller may also facilitate venting hydrogen, isolate hydrogen in storage or parts of the hydrogen lines, contact service personal, fire brigade, medical personal and the like. All to comply with the risk assessment made, in relation to the fault situation, describes to do to get from the unsecure situation caused by the error/fault to a safe situation which at least implies stopping the flow of hydrogen.

It should be mentioned that the process controller may also facilitate the tripping and alternatives hereto especially in the situation where the process controller facilitates the change from normal to non-normal mode of operation before the safety controller facilitates the change.

According to an embodiment of the invention, the tripping of the HRS is facilitated by a final safety element operated by the safety controller alone. This is advantageous in that this reduces the risk of malfunction of such actuator in a tripping event which could cause a dangerous situation.

According to an embodiment of the invention, the evaluation of the value of the first parameter performed by the safety controller comprises monitoring if the value exceeds or go below a defined threshold. It should be mentioned that two thresholds may be defined together defining a corridor within which the value of the first parameter is be during normal operation.

According to an embodiment of the invention, the threshold is determined dynamically during operation of the HRS. This is advantageous in that then the monitoring of parameters are made dynamic and is thereby adapted to the giver circumstances such as ambient conditions (temperature, pressure, humidity, etc.), information from the vehicle to be refueled, the storage, mode of operation, other components of the HRS, etc.

According to an embodiment of the invention, the safety controller facilitates control of a final process element used for tripping the operation of the HRS.

According to an embodiment of the invention, the software program on the safety controller is different form the software program on the process controller. This is advantageous in that since the two software programs are not the same and preferably not made by the same programmer risk of the same error occurs in both controllers are reduces significantly.

According to an embodiment of the invention, the software program of the safety controller implements a plurality of safety instrumented functions. Safety instrumented functions should be understood as a number of outlined control functions which are critical to safety of the operation of the HRS. Hence in order to increase safety in relation to HRS it is advantageous to increase monitoring and control in relation to these safety instrumented functions. The safety instrumented functions may monitor (and if needed control e.g. trip) leakages, vehicle vessel pressure, cooling system, pressure of hydrogen delivered to vehicle, etc.

According to an embodiment of the invention, the plurality of safety instrumented functions has individual windows for operation. This is advantageous in that requirements to a refueling process might change from a first refueling to the next refueling (ambient conditions, different vehicles with different start pressure, etc.). Accordingly, the individual safety instrumented functions window of operation is starting and stopping i.e. its monitoring is starting and stopping so to speak when the safety controller has observed one or a series of events such as measured valve position change, pressure or temperature change, flow detected, etc. This is by the safety controller interpreted as a given state of e.g. a refueling process and because the safety controller knows operation conditions at the different states of operation it is able to determine if the operation of the HRS is safe.

According to an embodiment of the invention, the safety instrument functions is selected from the list comprising: Excess Hydrogen Flow Monitoring, Start Up Refueling Leak Check, Hydrogen Delivery Pressure Monitoring, Cooling Category Monitor, Hydrogen Middle Pressure Monitoring, Target Pressure Monitoring, Vehicle Start Pressure Monitoring Moreover, the invention relates to the use of a HRS according to any of the preceding claims for refuelling a vessel of a vehicle.

Moreover, the invention relates to a method of determining safety instrumented functions for implementation in a safety controller of a HRS, the method comprises the steps of: dividing control functions required for controlling a HRS into safety instrumented functions and non-safety instrumented functions, determine input required for the safety controller to monitor the safety instrumented functions, determine output required from the safety controller for the safety controller to be able to control the safety instrumented functions Moreover, the invention relates a HRS according to any of the claims 1-28 at least partly controlled by a safety controller, wherein the control performed by the safety controller is based on at least one safety instrumented function. Preferably the control provided by the safety controller is tripping of the operation of the HRS.

FIGURES

Figure 2:
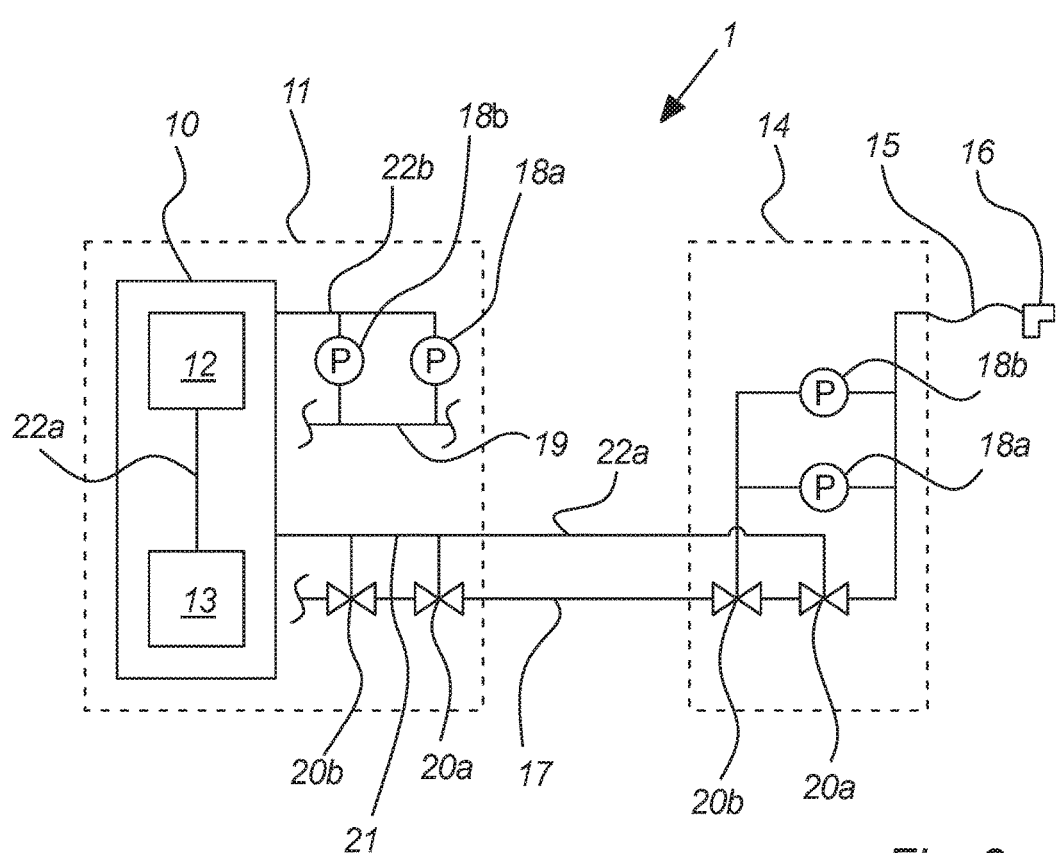
Figure 3:
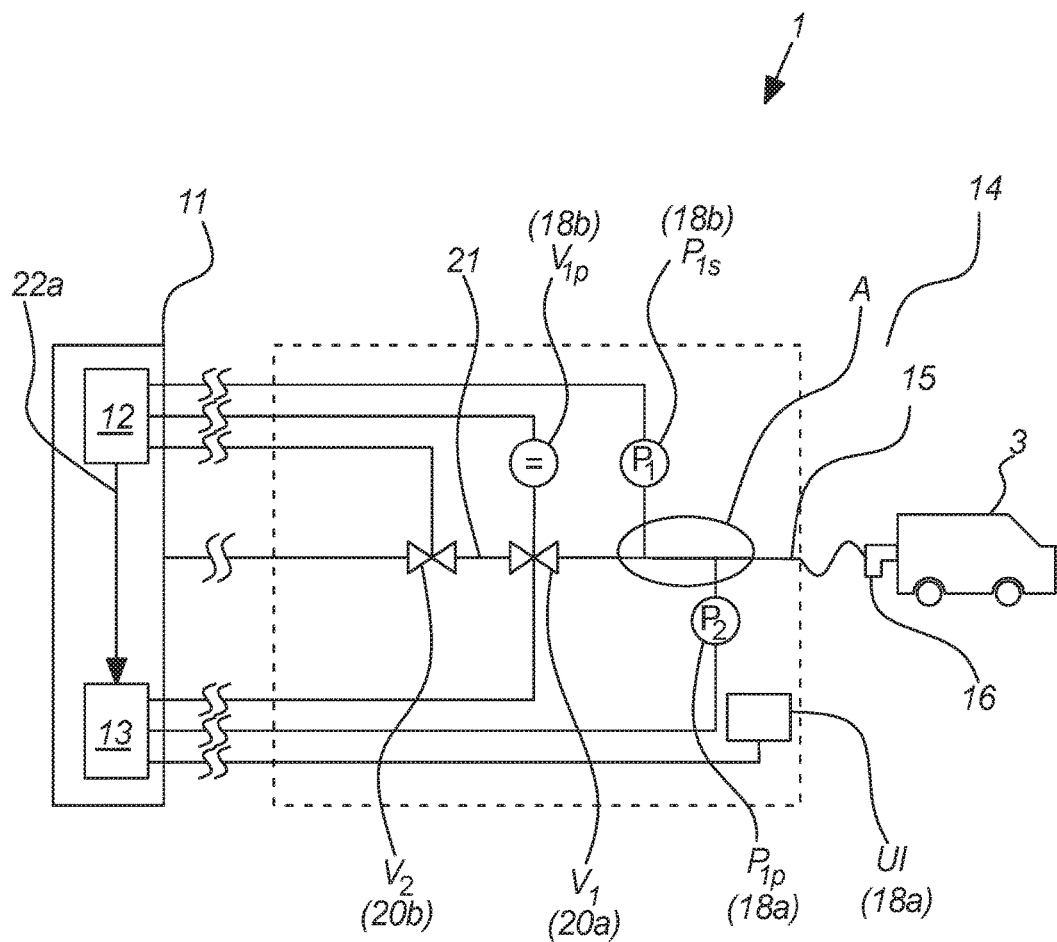
Figure 4A:
Figure 4B:
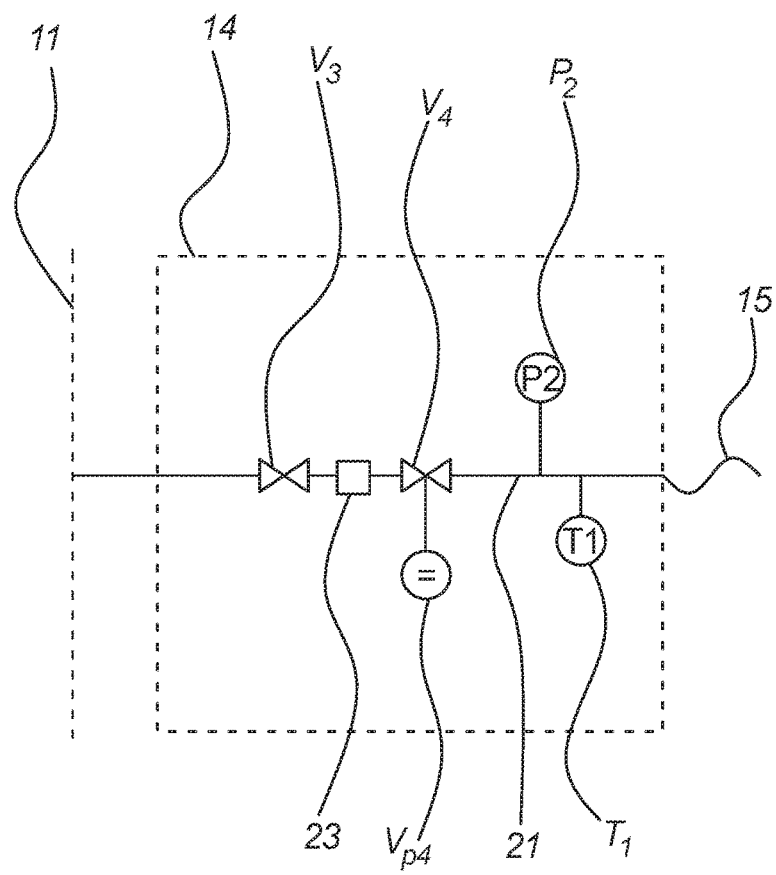

In the following, a few exemplary embodiments of the invention are described with reference to the figures, of which FIG. 1 illustrates a HRS according to an embodiment of the invention, FIG. 2 illustrates a center module and a dispenser module communicating according to an embodiment of the invention FIG. 3 illustrates an example of control of the HRS according to an embodiment of the invention, FIG. 4a illustrates a schematic view of the safety instrumented system according to an embodiment of the invention, and FIG. 4b illustrates the location in the HRS enclosure 11 and in the dispenser 14 of the HRS 1 of components of the safety instrumented system illustrated in FIG. 4a.

BRIEF DESCRIPTION OF THE INVENTION

FIG. 1 illustrates a schematic view of a HRS 1 according to an embodiment of invention. The HRS 1 supplies hydrogen to a receiving vessel 2 of a vehicle 3 from a hydrogen supply in the form of a supply network 4, external hydrogen storage 5, internal hydrogen storage 6 or a temporary hydrogen storage 7.

To regulate the hydrogen pressure, temperature, flow, time etc. to comply with currents standards such as e.g. the SAE J2601 standard for refuelling of a vehicle 3 with hydrogen, the HRS 1 comprises a compressor 8, a cooling system 9 and a control and monitoring system 10 all which are preferably located within the enclosure 11 of the HRS 1.

A refuelling process involves several states, including moving from a "ready state" to a "pre-refuelling state" when a refuelling is requested by a user. When the user has lifted the nozzle and attached it to a vehicle, the user may initiate "Refueling Start Up State" where the start pressure of the vessel of the vehicle is determined. Upon determining start pressure and other initial parameters a "Main Refuelling State" is performed where hydrogen is provided to the vessel of the vehicle for the purpose of filling the vessel of the vehicle. When the refuelling is completed a "Refuelling Stop State" is entered where preparations for returning to the ready state is made such as emptying hose and nozzle for hydrogen.

The control and monitoring system 10 includes a safety controller 12 and a process controller 13 which will be described in further details below.

At most locations of HRS 1 it is preferred to physically separate the HRS enclosure 11 from a dispenser 14 which is connectable to the vehicle 3 by means of a hose 15 and a nozzle 16 (hydrogen outlet). The HRS enclosure 11 and the dispenser 14 is connected by one or more supply lines 17 for supplying hydrogen from the HRS 1 via the dispenser 14 to the receiving vessel 2 of the vehicle 3.

Even though the HRS 1 illustrated on FIG. 1 is illustrated to comprise enclosure 11 and dispenser 14 separated and connected with supply lines 17 it should be mentioned that the components of the HRS 1 from hydrogen supply 4, 5, 6, 7 to the hydrogen outlet which in FIG. 1 is illustrate as a nozzle 16 and everything (valves, transducers, actuators, i.e. all components used for controlling the hydrogen flow) in the hydrogen flow path between may be integrated completely in one enclosure or as illustrated in FIG. 1 installed as one or more individual components.

FIG. 2 illustrates a schematic view of the control and monitoring system 10 of the HRS 1 according to an embodiment of the invention.

The main purpose of the control and monitoring system 10 is to ensure that the HRS 1 complies with all relevant standards both in relation to safety and refuelling. Accordingly the control and monitoring system 10 are receiving input from a plurality of transducers 18a, 18b (generally referred to as 18) which on FIG. 2 is measuring pressure P at hydrogen line 19 (line refers to a pipe facilitating flow of hydrogen). The transducers 18 could however be located anywhere in the HRS 1 from hydrogen input 4, 5, 6, 7 to hydrogen output at the nozzle 16. Further the transducers 18 may also provide input relating to external values such as temperature within and outside the HRS enclosure 11, etc. The transducers 18 are providing input relating to flow, pressure, temperature, valve position, and the like.

It should be mentioned that the transducer 18a is an example of a process measuring device and the transducer 18b is an example of a safety measuring device.

The input is used by the control and monitoring system 10 to regulate pressure, temperature, flow and the like. At FIG. 2 this control is facilitated by the illustrated valves 20a, 20b (generally referred to as 20) which controls the flow at hydrogen line 21 and thereby in the supply line 17 to the dispenser 14 and in the dispenser 14. The control performed by the control and monitoring system 10 is preferably done by controlling the compressor 8, cooling system 9, valves 20, etc.

It should be mentioned that the valve 20a is an example of a final process element and the valve 20b is an example of a final safety element.

The safety controller 12 and the process controller 13 may communicate however as will be described below it is preferred for safety reasons that only the safety controller 12 provides information to the process controller 13. With this said, in embodiments of the invention limited information may be sent to from the process controller 13 to the safety controller 12 an example could be a watch dog signal indicating that the process controller 13 is alive/online. No data used by the safety controller 12 in its monitoring and control (i.e. preferably tripping the operation of the HRS 1) is provided by the process controller 13.

Tripping should be understood as bringing the operation of the HRS from any normal process state to a secure state which most of the time means stopping or closing down the operation of the HRS e.g. by closing/opening valves controlling hydrogen flow. This is advantageous in that the temperatures and pressures at which a HRS operates can be both hard to control and dangerous for persons if not controlled properly.

Information exchanged between the controllers 12, 13 (preferably only from safety controller 12 to process controller 13) may include all data handled by the safety controller 12. Accordingly, data relating to state or mode of operation of the HRS 1, threshold values, measured parameters/values, etc. may be logged by the process controller 13. It should be mentioned that in case such data is provided to the process controller 13 it is not used in the control of the HRS 1. Hence such data may be sued for verification of measurements obtained by the process controller 13.

However the safety controller may facilitate an interrupt in the execution of the basic process control functions e.g. in the situation where a given time has passed since last leakage check. Typically if the safety controller 13 has tripped the operation of the HRS, this will be observed by the process controller via its measuring devices and following the process controller will also change to safety mode of operation. A normal mode of operation could include a standby and a refuelling mode and a non-normal mode of operation could include a safe and an emergency mode of operation. Hence a normal mode of operation of the HRS such as a refueling mode occurs when no components fail, no control software errors occur and all parameters are kept within its thresholds. A non-normal mode of operation of the HRS 1 such as a safe mode or emergency mode of operation occurs when a component fail, control software fails, a parameter exceeds its thresholds leading to non-compliance with current standards for refueling or danger for persons near the HRS 1 or the like.

At FIG. 2 the safety controller 12 and the process controller 13 of the control and monitoring system 10, transducers 18 and the final elements 20 are illustrated as communicating via a communication lines 22a, 22b, 22c. However alternative communication configuration may be preferred such as separate communication between safety controller 12 and its safety measuring devices 18b and final safety elements 20b together referred to as a safety instrumented system or abbreviated SIS. Beside or parallel to the communication of the safety instrumented system separate communication between process controller 13 and its process measuring device 18a and final process elements 20a (together referred to as basic process control system abbreviated BPCS) is preferably facilitated. It should be mentioned that the communication path 22a, 22b, 22c do not have to be wired in one or more communication systems. The communication could be implemented at least partly as any kind of wireless communication and where allowed any kind of communication bus, etc.

Accordingly the control and monitoring system 10 facilitate control of the HRS 1 by means of the process controller 13 and monitoring of this control by means of the safety controller 12.

According to an embodiment of the invention the monitoring of the HRS 1 by the safety controller 12 is preferably based on dynamic threshold values. This allows values of measured parameters to have different limits depending on the mode of operation of the HRS 1. Hence in a standby mode pressure and temperature of hydrogen at the dispenser 14 could be allowed to be less than in a refueling mode where values of pressure and temperature should comply with current standards.

The safety controller 12 therefore in real-time determine one or more threshold values for a parameter and safety evaluate these determined threshold values with the parameter measured by the safety measuring device 18b. The threshold values may be determine from a table look up, be predetermined for a given situation/mode wherein valued is determined e.g. based mode of operation. I.e. the threshold is allowed to have a first value in a standby mode and a second value in a refueling mode both the first and second values could be found from the table.

The evaluation (safety or process evaluation) of measured parameters and determined thresholds may include mathematical manipulation such as normalizing of the measured parameter, comparison of a plurality of measured parameters, calculations and the like. As an example hereof could be mentioned that a flow calculation is made based two pressure measurements and a temperature measurement. Pressure is measured on both sides of a component which provides a pressure drop. With knowledge of the hydrogen temperature the density of the hydrogen can be calculated when is then used to determine a flow of hydrogen. The evaluations are made possible and dynamic in that the safety controller 12 obtains input from its measuring devices 18b which measurements are used e.g. to indicate change of operation mode. Hence when e.g. the parameter received from a valve positioner monitoring one of the vales e.g. located in the dispenser 14 change from indicating valve state "CLOSE" to "OPEN" the safety controller 12 uses this input to determine that now operation mode change e.g. from standby to refueling mode.

According to an embodiment of the invention, a user is initiating a refueling via the user interface UI e.g. by payment which is registered by both the safety controller 12 and the process controller 13. The safety controller 12 then uses information from e.g. from a valve positioners 18*b* to determine when starter pressure is obtained. In the same way information from valve positioner and pressure sensors 18B can be used to determine when a shift in hydrogen storage (used for the refueling) and when the refueling ends.

It should be noted that the thresholds values based on which the safety controller 12 are monitoring and at least partly controlling the HRS 1 may also be "fixed" e.g. found from loop-up tables based on input values such as pressure and temperature. Whether the threshold values are "fixed" or dynamic may be determined by the refueling protocol followed. The preferred refueling protocols are found in the SAE J2601 standard. An example of a fixed threshold could be the pressure in the nozzle which is determined either by a standard or by the rated pressure of the nozzle. A threshold value for maximum allowed nozzle pressure could e.g. be 830 bar.

Alternatively, the limits or thresholds for operation parameters monitored by the safety controller 12 and associated safety instrumented function within a window of operation may be dynamic. This is because during a first part of a refueling e.g. the threshold for allowed temperature is different from the temperature during a second part of a refueling. Therefore, it is advantageous if the individual safety instrumented function accounts for this and evaluates its input relative to the current threshold. Hence one temperature will initiate interaction in the control (preferably only tripping) of the operation of the HRS from the safety controller in one part of the refueling process and not in another part.

The process controller 13 receives input that a standby mode should change to refueling mode by its measuring device 18*a* e.g. when it is registered that a user has removed the nozzle 16 from the dispenser 14, user interface UI at dispenser 14 is activated, payment accepted, or the like. As mentioned above the safety controller 12 preferably receives the same input but from its own safety measuring devices 18*b*.

The safety controller 12 then, based on its control software, is able to determine the threshold. Depending on the parameter, the threshold may include both an upper and a lower value for the parameter i.e. a corridor within which the parameter value have to be. The parameter value measured by the transducers 18 typically directly or indirectly represents a pressure, a temperature, a flow or the like.

If the measured parameter indicates that the parameter is about to or has left the corridor or exceeded the threshold, the safety controller 12 may change mode of operation from normal to non-normal mode of operation. The safety controller 12 change the mode of operation by controlling one of its final elements 20*b* such as a valve e.g. to stop the flow of hydrogen to the vehicle 3. This is preferably done with no interaction or exchange of information at all with the process controller 13 controlling the refueling of the vehicle 3.

In such situation, the safety controller 12 is preferably informing the process controller 13 of the change of operation mode. This advantageous in that then the process controller 13 may also control according to the new operation mode and e.g. close one of its controllable final elements 20*a*.

With reference to FIG. 3 an example of the above is described. The process controller 13 is receiving input from a user interface UI that a user is starting a refueling of a vehicle 3. The process controller 13 then change mode of operation from a standby mode to a refueling mode of operation which includes opening a valve V1 facilitating flow of hydrogen from the dispenser 14 to the vehicle 3. During the refueling the pressure P1 at area A of the hydrogen line 21 is measured by the pressure transducer P1*p* by the process controller 13. It should be mentioned that the user interface UI and the pressure transducer P1*p* are both examples of process measuring devices 18*a* and that valve V1 is an example of a final process element 20*a*.

The safety controller 12 is receiving input from a valve positioner VP1 that the valve V1 is opened and use this information to start determining a threshold e.g. for the allowed pressure P1 of hydrogen in the hydrogen line 21 at area A. It should be noted that the valve positioner VP1 and the pressure transducer P1*s* are examples of the safety measuring device 18*b*.

The refueling mode of operation is controlled and monitored by the process controller 13 to comply with current refueling standards. During the refueling the pressure at area A of the hydrogen line 21 is measured both by the pressure transducer P1*s* by the safety controller 12 and pressure transducer P1*p* by the process controller 13.

Preferably the distance between where transducers P1*p* and P1*s* are measuring pressure is between 0 and 2 meters preferably less than 1 meter. At FIG. 3 the transducers P1*p* and P1*s* are illustrated in series however they could also be located in parallel.

Normally if e.g. the pressure in area A exceeds its threshold, the process controller 13 will make sure to interrupt the refueling mode e.g. by closing one or more final process elements 20*a* stopping the flow of hydrogen. However in case the input from one or more process measuring devices 18*a* are missing or misleading, control software crashes or where one or more final process elements 20*a* are malfunctioning the flow of hydrogen may not be timely stopped.

In such situation the safety controller 12 ensures change from normal to non-normal mode of operation. This is possible due to the safety instrumented system comprising the safety controller 12 including control software preferably safety control software, measuring devices 18*b* and final safety elements 20*b* are all preferably completely independent of the process controller 13 and its control software, measuring devices 18*a* and finale process elements 20*a*.

In short the process controller 13 could be said to control the HRS 1 according to current standards whereas the safety controller 12 monitors the operation of the HRS 1 and only takes action if the current standards are not complied with. In addition, the safety controller 12 obviously preferably also monitors if e.g. design limits of a hydrogen storage, pipe or the like is exceeded. Such monitoring could be in relation to pressure, temperature and the like.

Accordingly, in case a first parameter such as the pressure measured at area A exceeds its threshold (i.e. allowed value/limited preferably defined by the current standard) the safety controller 12 may not know why this is happening nor why the process controller 13 does not act, however it makes sure e.g. to stop flow of hydrogen and thereby overrules the control of the process controller 13.

The thresholds used by the process controller 13 is typically more conservative that the thresholds in the safety controller 12. This is because it is preferred that it is the process controller that e.g. closes down the HRS 1 if necessary. With this said by operating with the same threshold values in the two controllers 12, 13 a larger operation window is obtained still with maximum safety.

With reference to FIG. 3 this is illustrated by transducer P1s, 18b which when measuring a pressure exceeding the determined threshold, this information is used by the safety controller 12 to close valve V2 and via communication path 22a communicates its control action or change of operation mode to the process controller 13. It should be mentioned that the valve V2 is an example of a final safety element 20b.

In the event of e.g. a defect process measuring device, data processor, software error or the like the process controller 13 may not observed that a threshold is exceed and flowingly does not initiate closing V1, the risk of an emergency situation occurs. To prevent such situation the present invention uses the parallel safety instrumented system. Hence based on the communication from the safety controller 12, the process controller 13 then preferably closes valve V1 thereby the refueling process is interrupted preferably by both the safety controller 12 closing valve V2 and by the process controller 13 closing valve V1.

If the safety controller 12 interrupts the operation of the HRS 1, the typically indicates a kind of malfunction in the basic process control system. Accordingly, it will often be necessary to investigate the root cause of the event. Such investigation may include analyzing data from the controllers 12, 13, manual inspection of measuring devices 18 and final elements 20 before a manual or automatic reset of the error.

Typically when so-called hard thresholds are exceeded tripping made by the safety controller requires manual reset. This is because such error should not be possible but since it did happen a service person has to investigate the cause of such error. An example of a hard threshold value could be the maximum pressure of the nozzle of e.g. 830 bar.

Errors relating to the refueling such as if e.g. the hydrogen temperature is a bit to high should be corrected by the process controller 13. However if it for some reason dose not lower the temperature the safety controller may trip or aboard the refueling process. Such error however may be automatically reset in that this is not some thing that should prevent a subsequent refueling process.

Measuring device/transducers is preferably measuring mass flow in dispenser 14, position of valve controlling hydrogen flow out of the dispenser 14, pressure as close to the nozzle as possible, temperature of hydrogen flow out of dispenser 14, etc. Further it should be mentioned that information from the vehicle e.g. via an infrared red communication channel can be divided in data to the safety controller 12, data to the process controller 13 or both controllers 12, 13 e.g. via the safety controller 12 to the process controller 13.

From the above description it is now clear that the control system 10 of the present invention facilitates a process controller 13 which is controlling the operation of the HRS 1 i.e. which step in the control software is to be executed next. This is in contrary to the safety controller 12 which based on monitoring events of the HRS 1 evaluates e.g. if the process controller 13 moves on to the next step of the control of the HRS 1.

Obviously the demands to the safety controller 12 are completely different than the demands to the process controller 13. As an example the safety controller 12 has to estimate based on monitoring the HRS e.g. the difference in stopping or pausing the refueling process. As examples hereof could be mentioned that the safety controller should be able to distinguish between a valve closing due to so-called bank shift from end of refueling (i.e. a pause in refueling process not a stop hereof).

FIG. 4a is a schematic view of safety instrumented system i.e. safety measuring device 18b providing input to the safety controller 12 which is controlling the final safety element 20b. Hence FIG. 4a only relates to the safety instrumented system controlled by safety controller 12 but a similar schematic view of the basic process control system controlled by the process controller 13 exists. Not illustrated is I/O modules which the measuring devices 18b and final elements 20b preferably are connected. These I/O modules are preferably connected to I/O modules of the safety controller 12 via a cable.

It should be mentioned that when referring to a Safety Instrumented System (SIS; Safety Instrumented System) a reference is made to a system comprising an engineered set of hardware and software controls which are especially used on critical process systems. A critical process system can be identified as one which, once running and an operational problem occurs, may need to be put into a "Safe State" to avoid adverse Safety, Health and Environmental consequences." i.e. tripping the operation of the HRS 1 in a or to avoid a hazardous situation.

The specific control functions performed by a SIS are referred to as Safety Instrumented Functions (SIF). They are implemented as part of an overall risk reduction strategy which is intended to eliminate the likelihood of a, previously identified, safety, health and environmental event that could range from minor equipment damage up to an event involving an uncontrolled catastrophic release of energy and/or materials."

The safety controller includes signal processing and logic for executing the separate functions identified by the unique SIFs. Hence the SIF is implemented as part of the safety controller receiving input from measuring devices 18b and controls final elements 20b.

Hence a Safety Instrumented System (SIS) is designed to maintain a safe state of the process when an unacceptable process conditions are detected. The Instrumentation and controls associated with the SIS operate independently of the basic process control system.

The basic process control provides a first layer of protection which will correct make a control action if e.g. a pressure or temperature which is out range to get the temperature back in the range again. The SIF's of the safety controller is a second layer of protection which is used where the basic control cannot e.g. get the temperature or pressure back within the range hence the SIF then prevent the hazardous situation. The components or control functions which require a SIF is determined by a risk analysis. Finally if the safety controller for some reasons do not stop the hazardous situation e.g. by tripping the operation a third level i.e. a mechanical pressure control valve may be activated.

The SIS is able to identify where in the refueling process i.e. which state in the process controller is by observing a pattern of changes in valve position, pressure, mass flow, etc. By knowledge of where in the refueling process the process controller is, the SIS and thereby the SIFs knows when their respective windows of operation opens and closes. An example could be the monitoring of the pressure ramp for the refueling the window of which could open when the start pressure of the vehicle is measured and closes e.g. when the vent valve opens.

FIG. 4b illustrates the location in the HRS enclosure 11 and in the dispenser 14 of the HRS 1 of components of the safety instrumented system illustrated in FIG. 4a. A few examples of safety instrumented functions (SIF; Safety instrumented function) will now be described with reference to FIG. 4b.

As mentioned above, a safety instrumented system comprise one or more safety instrumented functions each monitoring one or more safety related failure modes of the HRS 1. Further the safety instrumented function ensures the final elements of the safety instrumented system are activated to stop the evolution of or eliminate a hazard detected by the safety instrumented functions.

A first example of a SIF (SIF; Safety Instrumented Function) relates to vehicle start pressure monitoring.

This SIF is intended as a safety during a particular phase of a refueling namely the pressure equalization step between pressure of receiving vessel 2 and hydrogen in the dispenser 14 e.g. in hydrogen line 21.

This SIF should only be able to trip the operation of the HRS in a window of operation that opens 10 seconds after a user has initiated a refueling. This may be detected by the safety controller 12 by a valve positioner. Hence, the pressure equalizing window of operation may start e.g. when mass flow is detected and criteria is fulfilled and ended when the safety controller 12 detects Dispenser Node Valve and Dispenser Nozzle Valve are both in closed position.

This SIF requires input from a pressure transducer P2 (safety measuring device 18*b*) and based on this input the safety controller 12 controls the valve V3 (final safety element 20*b*).

Such control could include stopping flow of hydrogen if pressure is not equalized within e.g. 60 seconds.

A second example of a SIF relates to leakage check upon refueling start up. The hose 15 of the dispenser 14 is the direct interface between HRS 1 and vehicle 3. To ensure safe and reliable refueling the hose 15 is checked in refueling start-up sequence, and must not lose significant pressure over a given timeframe.

This SIF is intended as a safety during a particular phase of a refueling namely hose refueling leak check.

This SIF should only be able to trip the operation of the HRS 1 in a window of operation that opens when the process controller 13 and the safety controller 12 detects flow in the hydrogen line 21. The window closes when the leak check is completed.

The logic of this SIF requires input from safety measuring devices 18*b* including the valve positioner V4pos monitoring the position of valve V4, pressure transducer P2 and temperature transducer T1. Based on these inputs the safety controller 12 controls the final safety element 20*b* including valve V3.

Such control could include closing valve V3 if there is a difference of e.g. 1 bar and 50° C. between a first pressure/temperature check spaced e.g. 2 seconds in time from a second pressure/temperature check A third example of a SIF relates to excess hydrogen flow monitoring at dispenser. The hydrogen flow in dispenser 14 is calculated on basis of a pressure difference across a known flow restriction. The mass flow includes two pressure transmitters, and if the intermediate control valve is closed, disallowing flow of hydrogen, will result in false flow calculations. To avoid this, the state of the mentioned control valve is fed to the safety controller 12 by a Valve Positioner. If the measured (calculated) mass flow exceeds allowable limit for more than e.g. 2 seconds while the valve is open, refueling is stopped by closing final safety element 20*b* such as a valve.

The window of operation for this safety integrated system is always during normal operation of the HRS1.

The logic of this SIF requires input of the mass flow of hydrogen in the dispenser 14 and a signal from the valve positioner monitoring the status of the nozzle valve. Hence if the calculate mass flow in the dispenser 14 exceeds a limit of e.g. 0.060 kg/second for more than 2 seconds while control valve positioner shows nozzle valve is open, the operation of the compressor trips and safety final elements 20*b* closes stopping the hydrogen flow at different locations in the HRS 1. Further the process controller 13 is informed. Tripping form this SIF requires manual reset.

A forth example of a SIF is hydrogen delivery pressure monitoring. During the main fueling period, the HRS applies a pressure, targeting an Average Pressure Ramp Rate value based on the fueling Look-up tables. The pressure applied shall fall within upper and lower tolerance, based on the main fueling period elapsed time. With exception for the first five seconds of the main fueling period, the HRS shall stop fueling within five seconds if it cannot maintain its pressure ramp within the upper and lower tolerances.

This SIF is intended as a safety during a particular phase of a refueling (Main Refueling State), and should only be able to trip in a Window of Operation which opens when safety controller 12 has determined the necessary refueling parameters and closes when entering complete refueling state i.e. when a valve positioner measures that the vent valve facilitating venting the hose and nozzle is open.

The logic of this SIF requires input from a nozzle pressure transmitter and monitors that this pressure is between an upper and a lower threshold. In case the upper threshold is exceeded, the safety controller trips the operation of the HRS 1.

In case the pressure goes under the lower threshold the operation of the HRS 1 is tripped unless a pause timer is running. Except for the first 5 seconds of Main Refueling State, if the nozzle pressure experiences a pressure increase smaller than ½×average pressure ramp rate then the pause timer is stated i.e. measure and storage of the nozzle pressure is paused. While the pause timer is on, the Upper and Lower Pressure Tolerances are kept constant and the pressure may drop below lower threshold without this facilitates tripping of the operation of the HRS 1.

The pause timer is stopped when the dispenser delivery pressure transmitter experiences a pressure increase of more than ½× average pressure ramp rate and the development of Upper and Lower pressure Tolerances are now resumed. It is preferred that if the pause timer times out after e.g. 20 to 35 seconds the operation of the HRS 1 is tripped. Further the operation of the HRS 1 is also tripped if e.g. up to 10 seconds passes after the pause timer has been stopped, if the absolute value of the nozzle pressure minus the pressure measured during a pause (e.g. in for facilitating a change of hydrogen supply) is smaller than 100 bar and the nozzle pressure is below the lower threshold. Hereby is obtained an indication of leakage during refueling which is first noticeable e.g. during bank shift.

A fifth example of a SIF relates to monitoring of cooling category of at the dispenser 14. For any cooling category i.e. a temperature interval of the hydrogen which is determining for the speed of a refueling, after the 30 second startup period and 10 seconds after an Intended Non-fueling Time (occurs e.g. at bank shift (change of hydrogen source), intermediate leakage check, etc.), the cooling category shall maintain its corresponding temperature range. As an example of such temperature range could be mentioned one for the T40 cooling category from minus 33° C. to minus 40° C., here a hydrogen temperature of minus 30° C. is accepted if the hydrogen temperature is back in the range within 20 seconds. If the HRS 1 cannot hold the fuel delivery temperature within these cooling category temperature ranges, it shall follow a fallback procedure reducing performance of the HRS or terminate the fueling as soon as possible but within five seconds. The temperature range described above is defined as Cooling Category which is determined 30 seconds before this safety instrumented function is actively monitoring the hydrogen temperature. Hence the intention with this safety instrumented function is that a change of temperature of the dispensed hydrogen cause a change of cooling category twice must lead to shut down.

This safety instrumented function is intended as a safety during a particular phase of a refueling (Main Refueling State), and should only be able to trip in a Window of Operation that opens 30 seconds after Refueling Parameter State (state where parameter needed for starting refueling is determined such as average pressure ramp rate and target pressure) and closes when entering Complete or stop Refueling State (state where refueling has ended).

This safety instrumented function gets input form a nozzle temperature measuring device, hence if the nozzle temperature exceeds the upper limit for the current cooling category, a change to a "hotter" cooling category is initiated and a signal to the process controller 13 about this change is provided. In the event that the nozzle temperature exceeds the upper limit for the second time the safety controller 12 trips the operation of the HRS 1 is performed and the process controller 13 is informed.

A sixth example of a SIF relates to hydrogen middle pressure monitoring at the dispenser 14. During the main fueling period, the HRS 1 applies a pressure, targeting an average pressure ramp rate value based on the fueling Look-up tables. The pressure applied shall fall within upper and lower threshold (defining upper and lower limits of the average pressure ramp rate), based on the main fueling period elapsed time. With exception for the first five seconds of the main fueling period, the HRS 1 shall stop fueling within five seconds if it cannot maintain its pressure ramp within the upper and lower thresholds.

This SIF monitors pressure in relation to thresholds of the average pressure ramp rate, which the SIF must update continuously as pauses and change of cooling category and bank switch may change the usual time-dependent development of the thresholds. The intention with this SIF is that if the pressure during the refueling of a vehicle is out of specified thresholds defining the average pressure ramp rate this must lead to tripping of the operation of the HRS or at least a stop of the refueling process which after a period of time may automatically be reset.

This SIF is intended as a safety during a particular phase of a refueling (Main Refueling State), and should only be able to trip in a window of operation opening when the safety controller 12 has determined the necessary refueling parameters such as average pressure ramp rate or target pressure and closes when entering Complete Refueling State i.e. e.g. when the venting valve venting hydrogen from the hose and nozzle is opened by the process controller 13.

The logic of this SIF requires input from a nozzle pressure sensor which preferably is different from the nozzle pressure sensor describe above under the fourth example of a SIF. The logic of this SIF are operating as the logic of the logic of the fourth example described above with the same output.

A seventh example of a SIF relates to target pressure monitoring. The Target pressure defines an upper limit to safe refueling. The process controller 13 will use the Target Pressure minus a tolerance to recognize a successful refueling, while the safety controller 12 must enforce a shutdown through this SIF. The Target Pressure is determined in the Refueling Parameter State but may change in case communication is lost. To account for loss of communication the station may change Target Pressure from refueling with Communication to Target Pressure without Communication. If The nozzle pressure exceeded the Non-communication Target pressure at the time of communication-loss, refueling is terminated.

The intention with this SIF is to force tripping of the operation of the HRS 1 if the process controller 13 fails to act on reaching the target pressure of the refueling minus tolerance. Target pressure minus a tolerance is one way of determining successful end of a refueling.

This SIF is intended as a safety during a particular phase of a refueling (Pressure Equalization State), and should only be able to trip in a window of operation opening when parameters has been initiated and closing when complete refueling state is achieved.

The logic of this SIF is pressure transmitters (e.g dispenser pressure delivery transmitter and a target pressure) The safety controller 12 must read look-up table value of target pressure, and be aware that the safety controller may change look-up table value of the target pressure during refueling filling sequence due to change of e.g. pre-cooling temperature category. Hence the SIF's enforces the look-up table values within its window of operation therefore the SIF's only have to compare a look-up value with a pressure measurement.

If the dispenser pressure delivery transmitter exceeds the target pressure the operation of the HRS 1 is tripped. However, if the safety controller 12 registers communication is lost and dispenser delivery pressure transmitter, is higher than target pressure allowed in a refueling with no communication with the vehicle at the moment of communication loss, wait 10 seconds. If pressure drops more than 50 bars in these 10 seconds, the process controller 13 is assumed to have entered complete refueling state, and this SIF is no longer active.

The tripping of the HRS 1 by this SIF includes tripping the operation of the compressor and several safety final elements 20b is closes stopping the hydrogen flow at different locations in the HRS 1. Further the process controller 13 is informed. Tripping form this SIF requires manual reset.

An eighth example of a SIF relates to vehicle start pressure monitoring at the dispenser 14. The initial compressed hydrogen storage system pressure measured during startup will be used as P0 in applying of the Look-up table of the standard SAE J2601. If the measured initial CHSS pressure is less than 5 bar or greater than the pressure class nominal working pressure (700 MPa), then the HRS 1 shall terminate the fueling procedure as soon as possible but within five seconds."

This SIF operates within a Window of Operation where the window closes when mass flow exceeds a certain limit. The mass flow may momentarily differ from zero for each pulse, but only a consistent mass flow above 25 g/s should mark a successful pressure equalization state. The intention with this SIF is ensure that start pressure is within a safe range and if not it must deny refueling.

This SIF is intended as a safety during a particular phase of a refueling (Pressure Equalization State), and should only be able to trip the operation of the HRS 1 in a window of operation that opens 5 to 25 seconds after Refueling Request and closes when mass flow higher than 25 g/s has been registered consistently for 1 to 5 seconds.

The logic of this SIF requires input from a pressure sensor measuring the pressure delivery pressure and needs input form the safety controller relating to the mass flow through the dispenser. The following sequence is carried out when the refueling procedure is within the Window of Operation.

Start timer at e.g. 60 seconds

If the dispenser delivery pressure transmitter measure is out of safe range e.g. 5 bar to 700 bar, the operation of the HRS 1 is tripped and the process controller 13 is informed.

If a timeout after the e.g. 60 seconds has passed without registering the mass flow criteria (e.g. 25 g/s for 2 seconds), the operation of the HRS 1 is tripped and the process controller 13 is informed.

This SIF can be automatic reset after e.g. 60 seconds

Above is only describes a couple of SIFs to explain the control and monitoring performed by the safety controller 12. It should be mentioned that in the above examples of SIF's the sensors/transducers are measuring devices 18b and the final elements facilitating the tripping are referred to as 20b.

As mentioned the safety controller 12 is preferably providing information to the process controller 13 in case tripping or other control actions are performed. Also information may be provided if the safety instrumented function is found to be complied with.

It should be mentioned that the HRS of the present invention may also be sued for filling other than vehicle such as boats, trains, air planes, etc.

Further if not clear from the above then it is hereby mentioned that all of the embodiments and features described or illustrated may be combined to achieve a desired HRS design/control.

Finally it should be mentioned that it is preferred that the HRS 1 comprises a UPS (UPS; Uninterruptible Power Supply) facilitating safe shut down of the HRS by the process and safety controller.

LIST OF REFERENCE NUMBERS

1. HRS
2. Receiving vessel
3. Vehicle
4. Hydrogen supply network
5. External hydrogen storage
6. Internal hydrogen storage
7. Temporary hydrogen storage
8. Compressor
9. Cooling system
10. Control and monitoring system
11. HRS enclosure
12. Safety controller
13. Process controller
14. Dispenser
15. Hose
16. Nozzle
17. Supply line
18. Measuring device
   a. Process measuring device (Vp1, P1s)
   b. Safety measuring device (UI, P1p)
19. Hydrogen line
20. Final elements
   a. Final process element (V1)
   b. Final safety element (V2)
21. Hydrogen line
22a, 22b, 22c Communication line
A. Areas of pressure measurement at hydrogen line

The invention claimed is:

1. A hydrogen refueling station (HRS) for filling a vessel of a vehicle with hydrogen, the HRS comprising:

a hydrogen supply, a hydrogen outlet fluidly connectable to the vessel of the vehicle, and a basic process control system comprising a process controller configured to receive input from a plurality of process measuring devices and controlling a plurality of final process elements, said process controller executing a first set of software instructions for performing a plurality of associated basic process control functions facilitating monitoring and controlling the operation of the HRS, and a safety instrumented system comprising a safety controller separate from said process controller configured to receive input from a plurality of safety measuring devices separate from said process measuring devices to control a plurality of final safety elements separate from said final process elements, said safety controller executing a second set of software instructions different than said first set of software instructions to perform a plurality of associated safety instrumented functions, wherein at least one of the final process elements and the final safety elements facilitates stopping the operation of the HRS under the control of the associated process controller or the associated safety controller respectively.

2. A HRS according to claim 1, wherein the safety instrumented functions provides input to the basic process control functions and wherein the input is used to change mode of operation of the HRS to stop operation of the HRS.

3. A HRS according to claim 1, wherein the safety controller and the process controller comprises independent microprocessors.

4. A HRS according to claim 1, wherein the temperature of the hydrogen when filling the vessel of the vehicle is below minus 10° C.

5. A HRS according to claim 1, wherein a value of a first parameter is measured by a process measuring device and used as input to the process controller for controlling the HRS, wherein the control of the HRS by the process controller includes stopping the operation of the HRS based on a process evaluation of the first parameter, wherein the HRS further comprises a safety controller configured for monitoring a plurality of parameters of the HRS and for at least partly controlling the HRS, wherein the value of the first parameter is also measured by a safety measuring device and used as input to the safety controller, wherein the safety controller performs a safety evaluation of the first parameter, and wherein the control of the safety controller facilitates change from a normal mode of operation to a non-normal mode of operation of the HRS by changing state of a final safety element based on the safety evaluation of the value of the first parameter.

6. A HRS according to claim 1, wherein the first parameter measured by the process and safety measuring devices is measured in the hydrogen flow path between the hydrogen supply and the hydrogen output and wherein the first parameter is chosen from the list comprising: pressure, flow of hydrogen, valve position, temperature and time.

7. A HRS according to claim 5, wherein the safety controller communicates a stop signal to the process controller if the HRS is operated in normal operation mode at the same time as the safety evaluation of the value of the first operation parameter is determined to exceed its limits.

8. A HRS according to claim 1, wherein the process controller and the safety controller are controlling the same final elements.

9. A HRS according to claim 1, wherein the process measuring device is measuring the first parameter at a first location and the safety measuring devices are monitoring the first parameter at the first location.

10. A HRS according to claim 1, wherein the safety controller is at a safety level which is equal to or higher than the safety level of the process controller.

11. A HRS according to claim 1, wherein the safety measuring devices is at a safety level which is equal to or higher than the safety level of the process measuring devices.

12. A HRS according to claim 5, wherein the change from normal to non-normal mode of operation is facilitated by tripping the operation of the HRS by means of at least one final safety element, wherein the tripping of the HRS is facilitated by a final safety element operated by the safety controller alone.

13. A HRS according to claim 5, wherein the evaluation of the value of the first parameter performed by the safety controller comprises monitoring if the value exceeds or go below a defined threshold.

14. A HRS according to claim 13, wherein the threshold is determined dynamically during operation of the HRS.

15. A HRS according to claim 1, wherein the safety controller facilitates control of a final process element used for tripping the operation of the HRS.

16. A HRS according to claim 1, wherein the plurality of safety instrumented functions has individual windows for operation.

17. A HRS according to claim 1, wherein the safety instrument functions is selected from the list comprising: Excess Hydrogen Flow Monitoring, Start Up Refueling Leak Check, Hydrogen Delivery Pressure Monitoring, Cooling Category Monitor, Hydrogen Middle Pressure Monitoring, Target Pressure Monitoring, Vehicle Start Pressure Monitoring.

18. Use of a HRS according to claim 1 for refuelling a vessel of a vehicle.

19. A hydrogen refueling station (HRS) for filling a vessel of a vehicle with hydrogen, the HRS comprising:
a hydrogen supply,
a hydrogen outlet fluidly connectable to the vessel of the vehicle, and
a process controller including a first microprocessor configured to execute a first set of software instructions to monitor and control the operation of the HRS, and
a safety instrumented system comprising a safety controller including a second microprocessor separate from said first microprocessor and that is configured to receive input from a plurality of safety measuring devices to control a plurality of final safety elements, said second microprocessor being configured to execute a second set of software instructions different than said first set of software instructions to perform a plurality of associated safety instrumented functions,
wherein at least one of the final process elements and the final safety elements facilitates stopping the operation of the HRS under the control of the associated process controller or the associated safety controller respectively.

20. A hydrogen refueling station (HRS) for filling a vessel of a vehicle with hydrogen, the HRS comprising:
a hydrogen supply,
a hydrogen outlet connectable to the vessel of the vehicle, and
a process controller configured for monitoring and controlling the operation of the HRS, wherein the process controller executes a first set of software functions to determine a value of a first parameter is measured by a process measuring device and used as input to the process controller for controlling the HRS, and wherein
the control of the HRS by the process controller executing the first set of software instructions includes stopping the operation of the HRS based on a process evaluation of the first parameter,
the HRS further comprising a safety controller separate from said process controller configured to execute a second set of software instructions different than said first set of software instructions to monitor a plurality of parameters of the HRS via inputs to the safety controller from safety devices and for at least partly controlling the HRS via outputs from the safety controller,
wherein the value of the first parameter is also measured by a safety measuring device and used as input to the safety controller, and
wherein the safety controller performs a safety evaluation of the first parameter, and wherein
the control of the safety controller facilitates change from a normal mode of operation to a non-normal mode of operation of the HRS by changing state of a final safety element based on the safety evaluation of the value of the first parameter.

* * * * *